United States Patent [19]
Bohacik

[11] Patent Number: 5,749,179
[45] Date of Patent: May 12, 1998

[54] WALL BRACKET FOR A PRE-RINSE ASSEMBLY

[75] Inventor: Richard P. Bohacik, Lanoka Harbor, N.J.

[73] Assignee: Component Hardware Group, Inc., Lakewood, N.J.

[21] Appl. No.: 459,742

[22] Filed: Jun. 2, 1995

[51] Int. Cl.[6] ................................................ B05B 15/06
[52] U.S. Cl. .......................... 52/127.2; 239/283; 248/75
[58] Field of Search ............................ 285/341, 343; 239/280, 282, 283; 248/75; 52/127.2; 411/355

[56] References Cited

U.S. PATENT DOCUMENTS

| | | | |
|---|---|---|---|
| 2,073,307 | 3/1937 | Isenberg | 239/282 |
| 2,133,020 | 10/1938 | Fehrenbach | 248/75 |
| 2,216,149 | 10/1940 | Weiss | 248/75 |
| 2,625,434 | 1/1953 | Freestone | 239/280 |
| 2,749,148 | 6/1956 | Schneiderman | 285/343 X |
| 3,121,235 | 2/1964 | Gellmann | 239/283 X |
| 4,593,940 | 6/1986 | Wilder | 285/341 X |
| 5,037,140 | 8/1991 | Anderson | 285/341 X |
| 5,074,599 | 12/1991 | Wirbel et al. | 285/343 X |

*Primary Examiner*—Christopher Todd Kent
*Attorney, Agent, or Firm*—McAulay Fisher Nissen Goldberg & Kiel, LLP

[57] ABSTRACT

The wall bracket for the pre-rinse assembly includes a rod which is telescopically fitted in a base, a ferrule on the end of the rod and a compression nut which is threaded onto the base to circumferentially press the ferrule into clamping relation with the rod. The ferrule is sandwiched between the compression nut and the base.

6 Claims, 1 Drawing Sheet

WALL BRACKET FOR A PRE-RINSE ASSEMBLY

This invention relates to a wall bracket and, more particularly to a wall bracket for a pre-rinse assembly.

As is known, pre-rinse assemblies are typically used by institutional and food service personnel for directing water from a faucet onto items to be cleaned in a sink or the like. Generally, such pre-rinse assemblies have been mounted on a faucet attached to the sink in either a deck mounted arrangement or a wall mounted arrangement. To this end, the pre-rinse assemblies have employed a vertical riser pipe which can be coupled to a faucet to receive an upward flow of hot and/or cold water and a hose extending from the riser pipe by means of which water can be directed to any selected area of a sink. Various types of spray valve assemblies have also been secured at the end of the hose for manual operation so as to effect a pre-rinsing of the items to be washed.

In the past, in order to secure the riser pipe against unwarranted movement, wall brackets have been provided to secure the riser pipe relative to an adjacent wall. For example, one known wall bracket includes a base which can be secured to a wall, as by screws and a rod which can be slid horizontally into the bracket and secured at the opposite end to the vertical riser pipe, for example, by means of a clamp. In order to secure the rod to the base, use has been made of a set screw which is threaded through a tubular stem in the base into abutment with the end of the rod slid into the base. However, several problems arise with the use of set screws. For example, most plumbers do not carry the type of tool, e.g. an Allen wrench to tighten the set screw. Also, because the set screw is relatively small, any overtightening of the set screw easily strips the base so that the function of the base in anchoring the riser pipe of the assembly is rendered useless. Further, if tightened, the set screw does not hold up to constant abuse. As a result, the rod may slide out of the base resulting in either the breaking of a pre-rinse assembly or causing a dishwasher to support the vertical riser pipe while rinsing the dishes in a sink.

Accordingly, it is an object of the invention to securely mount a pre-rinse assembly in place.

It is another object of the invention to simplify the mounting of a pre-rinse assembly on a wall.

It is another object of the invention to avoid loosening of a wall mounted pre-rinse assembly during use.

Briefly, the invention provides a wall bracket for a pre-rinse assembly which includes a base, a rod, a ferrule and a compression nut.

The base of the wall bracket is provided with suitable means such as holes to permit mounting on a wall, for example via screws or the like. In addition, the base has a tubular portion which extends axially of the base and which is provided with an external thread.

The rod is of conventional structure and has one end telescopically received in the tubular portion of the base. In this regard, the rod is made of a material which can be readily cut to a desired length and thereafter slid into the base.

The ferrule is disposed on and about the rod and is abutted at one end against the tubular portion of the base. This ferrule is made of any suitable material so as to be circumferentially compressed or squeezed into a tightened or clamping engagement with the rod.

The compression nut is disposed on the rod concentric to the ferrule and has one end abutting the ferrule and an opposite end threaded onto the external thread of the tubular portion of the base. Upon threading of the nut onto the tubular portion of the base, the nut sandwiches the ferrule between the nut and the tubular portion of the base. Continued rotation of the compression nut serves to circumferentially press the ferrule into clamping engagement with the rod in order to secure the rod to the base. Rotation of the compression nut on the tubular portion of the base can be accomplished with any suitable tool such as a wrench, channel lock or the like. Accordingly, installation of the wall bracket is very easy for a plumber and provides a positive securement of the bracket components.

The wall bracket is used with a pre-rinse assembly which includes a vertically disposed riser pipe and a hose. In this respect, the riser pipe is secured at a lower end to a faucet or valve assembly in order to receive a flow of water therefrom and is secured at an intermediate point to a free end of the rod of the wall bracket, for example, via a clamping means at the end of the rod. In this respect, the end of the rod may be bifurcated to receive the riser pipe while the clamping means is formed of a clamping block provided with a recess to fit about the riser pipe and a pair of screws or bolts which can be threaded into the bifurcated end of the rod to clamp the clamping block against the riser pipe.

The hose is secured at one end to the riser pipe to convey water therethrough and has a suitable spray valve assembly mounted at the free end in known manner.

A spring mechanism may also be disposed about the hose and be fitted to the riser pipe in order to resiliently maintain a portion of the hose vertical. Thus, as is conventionally known, such a spring acts to support the flexible hose and to align and hold a spray head in the user's preferred position.

These and other objects and advantages of the invention will become more apparent from the following detailed description taken in conjunction with the accompanying drawings wherein.

Figure 1:
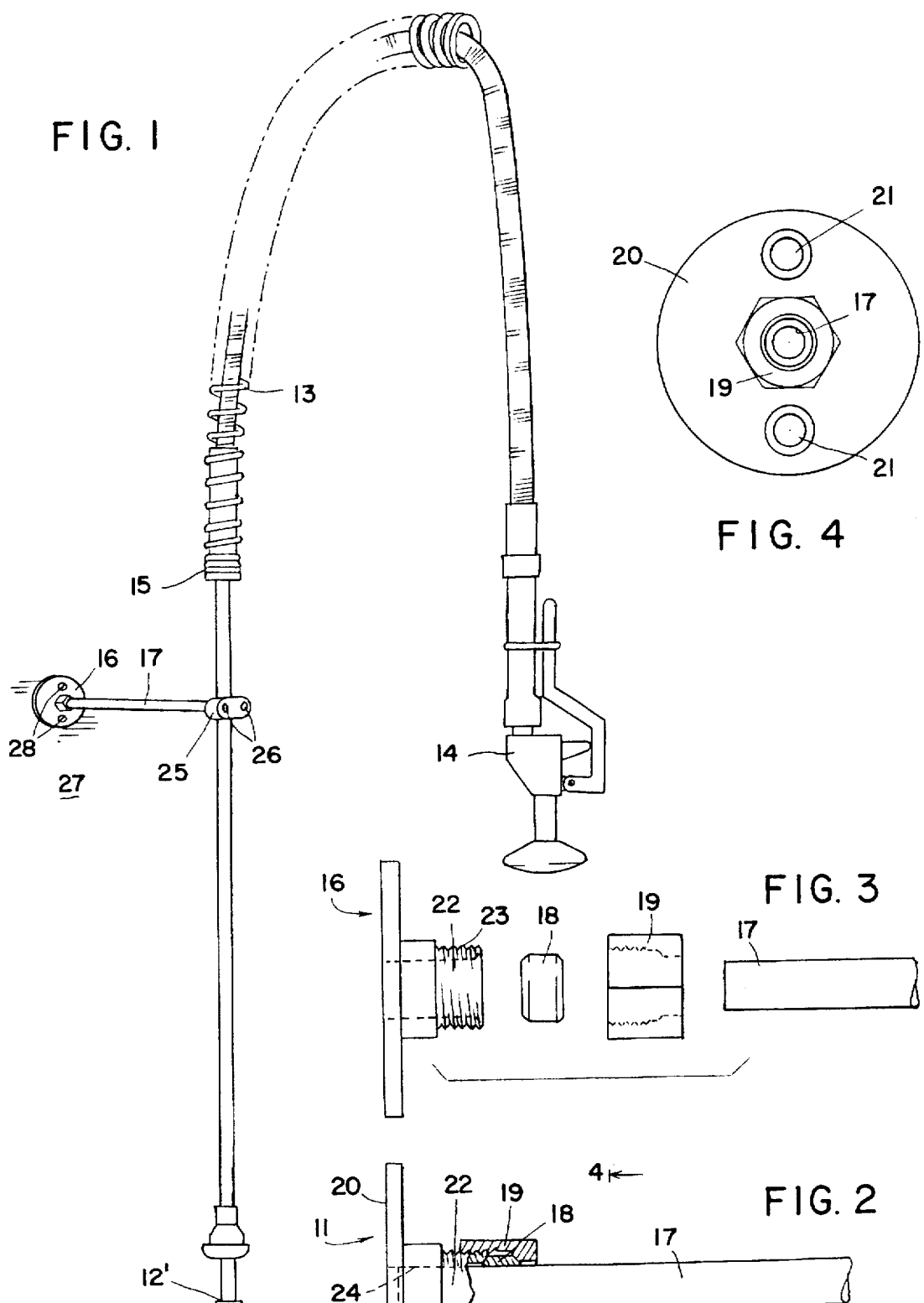
FIG. 1 illustrates a deck mounted pre-rinse assembly in accordance with the invention.

Referring to FIG. 1, the deck mounted pre-rinse assembly 10 includes a wall bracket 11, a vertically disposed riser pipe 12 for receiving an upward flow of water, for example from a faucet or valve 12' of a sink in which dishes are to be washed, a hose 13 extending from the riser pipe and a spray valve 14 at the end of the hose 13.

The riser pipe 12, hose 13 and spray valve 14 are of conventional structure and need not be further described. For example, the hose 13 may be formed of a flexible stainless steel outer casing over a rubber cord. A secondary strain relief coil of 0.125 diameter chrome plated steel wire is also disposed about the end of the outer casing adjacent a coupling of the hose 13 to the riser pipe 12 in order to transfer a load stress away from the part of the hose most subject to flexing and weakness in order to distribute the load evenly over an extended area. As indicated, a spring mechanism 15 is disposed about the hose 13 and fitted to the riser pipe 12 in order to resiliently maintain a portion of the hose 13 vertical. Such a spring mechanism 15 is also known and may be in the form of a heat treated riser spring which acts to support the hose and to align and hold the spray head in the user's preferred position.

Figure 3:
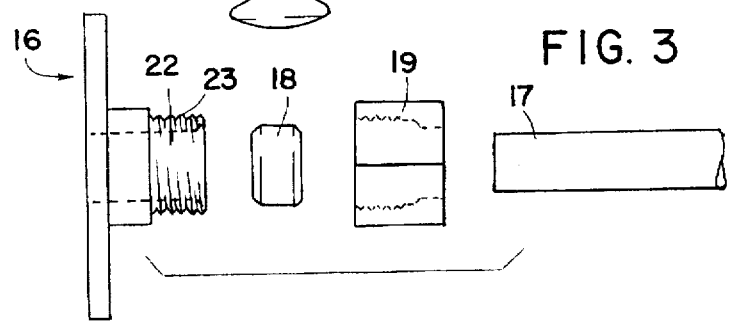
FIG. 3 illustrates an exploded view of one end of the wall bracket constructed in accordance with the invention.
Figure 2:
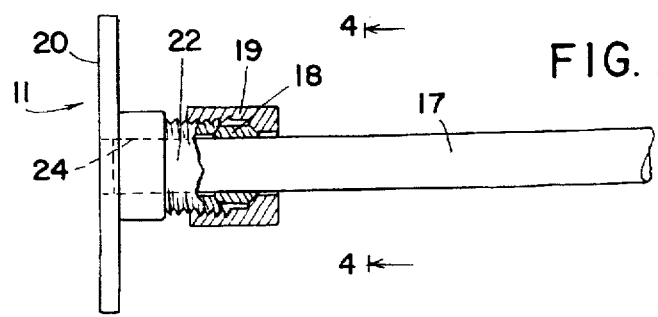
FIG. 2 illustrates a partial cross-sectional view of the wall mounted end of the wall bracket employed in the assembly of FIG. 1.

Referring to FIGS. 2 and 3, the wall bracket 11 includes a base 16, a rod 17, a ferrule 18 and a compression nut 19.

Figure 4:
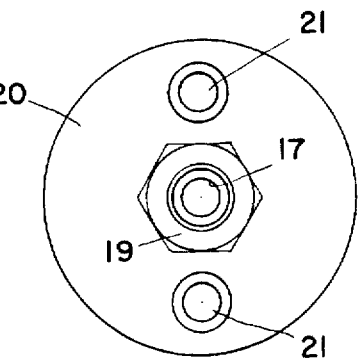
FIG. 4 illustrates a view taken on line 4—4 of FIG. 2.

The base 16 is made, e.g. of zinc or brass or the like, and includes a circular plate 20 having means in the form of a pair of openings 21 (see FIG. 4) so as to receive fasteners, such as screws or the like, in order to permit mounting of the base on a wall or similar vertical surface. In addition, the base 16 has a horizontally disposed tubular portion 22 extending co-axially from the plate 20 and which is provided with an external thread 23. The plate 20 also has a through-bore 24 aligned with the tubular portion 22 and into which the rod 17 may slide.

The rod 17 is made of any suitable material, such as chrome plated brass, and is further of a material which can be cut with suitable tools in order to obtain a desired length for the purposes intended. As indicated, the rod 17 is of a diameter to telescopically fit within the tubular portion 22 of the base 16.

The ferrule 18 is made of any suitable material and is disposed on and about the rod 17, for example in a slip fit manner. Typically, the ferrule 18 is placed adjacent to the end of the rod 17 which is slid into the base 16 so that the ferrule 18 can abut the end of the tubular portion 22 of the base 16. In this regard, the mouth of the tubular portion 22 may be chamfered internally so as to matingly receive a similar chamfered surface of the ferrule 18.

The compression nut 19 is disposed concentrically about the ferrule 18 and rod 17 and is threaded onto the thread 23 of the tubular portion 22 of the base 16. As indicated, the compression nut 19 has an internal shoulder abutting the ferrule 18 while the opposite end is threaded onto the base 16 to sandwich the ferrule 18 between the nut 19 and end of the tubular portion 22 of the base 16. In this regard, tightening of the compression nut 19 serves to circumferentially press the ferrule 18 into clamping engagement with the rod 17 in order to secure the rod 17 to the base 16.

The compression nut 19 may be made of any suitable material such as stainless steel, brass, zinc, plastic or the like.

Referring to FIG. 1, the free end of the rod 17 is provided in conventional manner with a bifurcation so as to receive the riser pipe 12 therein. In addition, a clamping means in the form of a clamping block 25 having a recess receiving the riser pipe 12 is secured to the bifurcated end of the rod 17 by means of a pair of screws 26, bolts or the like.

In order to use the wall bracket 11, the base 16 is secured to a wall 27, for example by the means of a pair of screws 28 (see FIG. 1). Next, the rod 17 is cut to the appropriate length, if necessary. In addition, the ferrule 18, if not already in place, is slid onto the rod 17 adjacent the end to be mounted. The rod 17 is then slid into the tubular portion 22 of the base 16 and the ferrule 18 brought into abutment with the tubular portion 22. As indicated in FIG. 2, in this position, the end of the rod 17 is disposed within the plate 20 of the base 16. Next, the compression nut 19 which has been previously mounted on the rod 17 is brought up against the ferrule 18 and threaded onto the tubular portion 22 of the base 16. Tightening of the compression nut 19 serves to circumferentially press the ferrule 18 into clamping engagement with the rod 17. Thus, a secure clamping fit is maintained between the rod 17 and the base 16.

Next, the vertical riser pipe 12 having been installed on a faucet may then be secured to the bifurcated end of the rod 17 in conventional fashion.

The components of the wall bracket 11 may be supplied as a unit in which case the compression nut 19 may be loosely threaded onto the base 16 with the ferrule 18 disposed therebetween. Alternatively, the components may be supplied separately in a suitable kit or the like.

The invention thus provides a bracket for a pre-rinse assembly which is able to securely maintain a vertical riser pipe in a fixed position. Further, the invention provides a wall bracket which can be readily assembled and mounted on a wall. The invention further provides a wall bracket which can be subjected to constant abuse without loosening of the rod. In this respect, should the compression nut loosen over time, a simple adjustment may be made with a tool in order to maintain the clamping arrangement between the rod and base of the bracket.

What is claimed is:

1. A pre-rinse assembly comprising
a wall bracket having a base for mounting on a wall, a tubular portion extending from said base with an external thread thereon, a rod having one end telescopically received in said tubular portion, a ferrule disposed on said rod and abutted against an end of said tubular portion and a compression nut concentric to said ferrule and said rod, said nut having an internal shoulder at one end abutting said ferrule and an opposite end threaded onto said thread of said tubular portion to sandwich said ferrule between said nut and said end of said tubular portion while circumferentially pressing said ferrule into clamping engagement with said rod;
a vertically disposed riser pipe secured to a second end of said rod for receiving an upward flow of water; and
a hose having one end secured to said pipe to convey water therethrough.

2. An assembly as set forth in claim 1 wherein said tubular portion is horizontally disposed.

3. An assembly as set forth in claim 2 wherein said rod is made of chrome plated brass.

4. An assembly as set forth in claim 1 which further comprises a spring mechanism disposed about said hose and fitted to said riser pipe to resiliently maintain a portion of said hose vertical.

5. A pre-rinse assembly as set forth in claim 1 wherein said end of said tubular portion is chamfered to matingly receive a chamfered surface of said ferrule.

6. A wall bracket for a pre-rinse assembly, said bracket comprising
a base for mounting on a wall and having a tubular portion with an external thread;
a rod having one end telescopically received in said tubular portion of said base;
a ferrule disposed on and about said rod and abutted at one end against one end of said tubular portion of said base;
a compression nut concentric to said ferrule, said nut having an internal shoulder abutting said ferrule and an end threaded onto said thread of said tubular portion to sandwich said ferrule between said nut and said end of said tubular portion while circumferentially pressing said ferrule into clamping engagement with said rod to secure said rod to said base; and
a clamping means at an opposite end of said rod from said base for receiving a riser pipe therein.

* * * * *